US007599798B2

(12) United States Patent
Beasley et al.

(10) Patent No.: US 7,599,798 B2
(45) Date of Patent: Oct. 6, 2009

(54) MIGRATING COMPOSITE SEISMIC RESPONSE DATA TO PRODUCE A REPRESENTATION OF A SEISMIC VOLUME

(75) Inventors: Craig J. Beasley, Houston, TX (US); Phil Kitchenside, Orpington (GB); Nicolae Moldoveanu, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/853,592

(22) Filed: Sep. 11, 2007

(65) Prior Publication Data

US 2008/0065333 A1 Mar. 13, 2008

Related U.S. Application Data

(60) Provisional application No. 60/825,154, filed on Sep. 11, 2006.

(51) Int. Cl.
*G01V 1/28* (2006.01)
*G01V 1/00* (2006.01)

(52) U.S. Cl. .......................... 702/17; 367/59
(58) Field of Classification Search ............ 702/17, 702/1, 2, 11, 13, 14, 16; 367/14, 21, 23, 367/24, 37, 38, 40, 43, 48, 49, 59; 703/5
See application file for complete search history.

(56) References Cited

U.S. PATENT DOCUMENTS 5,621,700 A * 4/1997 Moldoveanu ............... 367/24

| 5,924,049 A | * | 7/1999 | Beasley et al. | ................ 702/17 |
| 6,021,094 A |   | 2/2000 | Ober et al. | .................... 367/53 |
| 6,545,944 B2 |  | 4/2003 | de Kok | ........................ 367/56 |

OTHER PUBLICATIONS

Bonomi et al., Wavefield Migration Plus Monte carlo Imaging of 3D Prestack Seismic Data, Sep. 5, 2006, Geophysical Prospecting, 54, pp. 505-514.*
Jing et. al, "Encoding multiple shot gathers in prestack migration," SEG 2000 Expanded Abstracts.
Romero et al., "Phase encoding of shot records in prestack migration", Geophysics, vol. 65, No. 2 (Mar.-Apr. 2000); p. 426-436.
Gazzola et al., "An example of wavefield depth migration and Monte Carlo imaging in West Africa deep waters", SEG Int'l Exposition and 74th Annual Meeting * Denver, Colorado * Oct. 10-15, 2004.

* cited by examiner

*Primary Examiner*—Michael P. Nghiem
*Assistant Examiner*—Toan M Le
(74) *Attorney, Agent, or Firm*—Dan C. Hu; Liangang (Mark) Ye; Jeffrey E. Griffin

(57) ABSTRACT

A subterranean structure is characterized using composite seismic response data received from a plurality of sources. Phase encoding is applied to the data in which phase shifts are selected based on frequency variation of noise terms. The phase-encoded data is then migrated and a representation of the subterranean structure is produced according to the migrating.

21 Claims, 4 Drawing Sheets

MIGRATING COMPOSITE SEISMIC RESPONSE DATA TO PRODUCE A REPRESENTATION OF A SEISMIC VOLUME

CROSS-REFERENCE TO RELATED APPLICATION

This claims the benefit under 35 U.S.C. § 119(e) of U.S. provisional application Ser. No. 60/825,154, entitled "Data Acquisition and Processing Method for Multiple Simultaneous Sources," filed Sep. 11, 2006, which is hereby incorporated by reference.

TECHNICAL FIELD

The invention relates generally to migrating composite seismic response data to produce a representation of a seismic volume.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations on an earth surface, sea floor or at a sea surface (or in a wellbore), with the seismic sources activated to generate seismic waves directed into a subterranean structure. Examples of seismic sources include explosives, air guns, or other sources that generate seismic waves.

The seismic waves generated by a seismic source travel into the subterranean structure, with a portion of the seismic waves reflected back to the surface (earth surface, sea floor, sea surface, or wellbore surface) for receipt by seismic sensors (e.g., geophones). These seismic sensors produce signals that represent detected seismic waves. Signals from the seismic sensors are processed to yield information about the content and characteristic of the subterranean structure.

Seismic migration refers to the process of constructing surfaces of subterranean elements that are part of the subterranean structure of interest from recorded seismic data. The process of migration causes generation of an image of a seismic section or volume in the subterranean structure. Migration improves the image of a seismic section or volume by correcting for lateral mis-positioning of dipping seismic reflectors, misplacement of subterranean reflectors due to structural dip, discontinuities, curvature of formations, and other factors.

To perform marine surveying, a sea vessel can be used to tow several streamers, where each streamer includes a number of seismic receivers. Seismic sources can be towed by the same sea vessel, or by different sea vessels sailing parallel courses.

Conventionally, discrete seismic sources are activated in sequence to produce discrete shot gathers. The discrete shot gathers are then migrated to produce discrete images, which are then summed together to form a composite image that represents a subterranean structure of interest. This process involves activating a first seismic source, recording the seismic data due to activation of the first seismic source, then separately activating a second seismic source, recording the resulting seismic data due to the activations of the second seismic source, and so forth. For each particular gather, a given source is activated multiple times to produce different shots, while the given source is moving. A gather is thus a series of measurements made by receivers for different positions of a source. If many seismic sources are used, then the sea vessel that tows the streamers containing the seismic receivers would have to be towed relatively slowly; otherwise, the spacing between shots for a given source can become relatively large.

SUMMARY

In general, a method of characterizing a subterranean structure includes receiving composite seismic response data resulting from a plurality of seismic sources. Moreover, the composite seismic response data is migrated, where the migrating includes reducing a noise term that results from migrating the composite seismic response data. A representation of the subterranean structure is produced according to the migrating.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
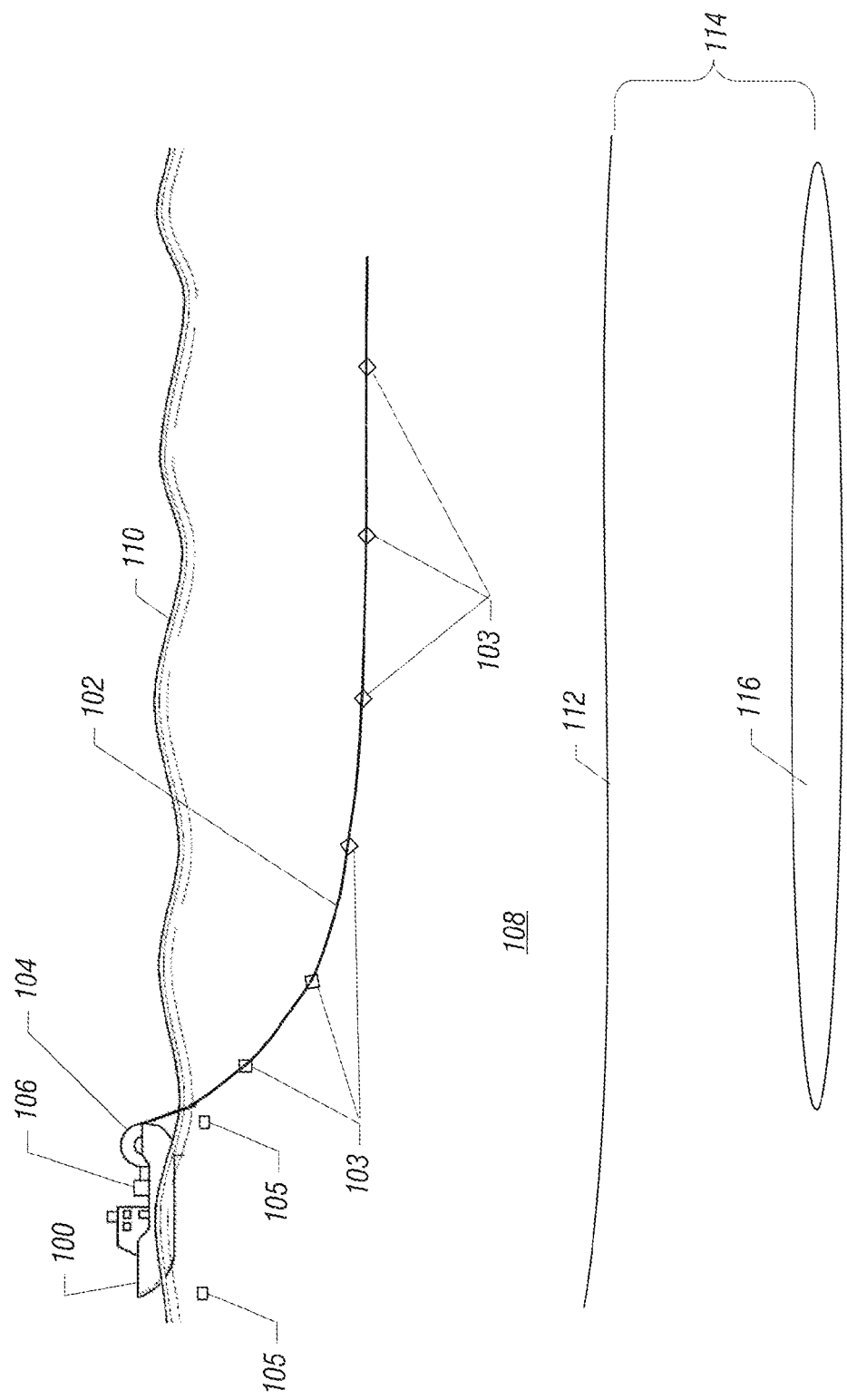
FIG. 1 illustrates a sea vessel that is able to deploy a streamer (or multiple streamers) in a body of water, according to an example embodiment.

FIG. 1 illustrates a sea vessel 100 that has a reel or spool 104 for deploying a streamer 102, which is a cable-like structure having a number of seismic sensors or receivers 103 for performing a subterranean survey of a subterranean structure 114 below a sea floor 112. Note that multiple streamers can be towed by the sea vessel 100. A portion of the streamer 102, and more particularly, the receivers 103, are deployed in a body of water 108 underneath a sea surface 110. The streamer 102 is towed by the sea vessel 100 during a seismic operation. In an alternative implementation, instead of using a streamer that is towed in the water by the sea vessel 100, a seabed cable can be used instead, where the seabed cable is deployed from a reel on the sea vessel and laid on a sea floor 112.

Also depicted in FIG. 1 are a number of seismic sources 105 (which can be towed by the same sea vessel or a different sea vessel) that produce seismic signals (source wavefields) propagated into the body of water 108 and into the subterranean structure 114. Examples of seismic sources include air guns, explosives, or other acoustic wave generators. The signals are reflected from elements (e.g., layers) in the subterranean structure 114, including a resistive body 116 that can be any one of a hydrocarbon-containing reservoir, a fresh water aquifer, an injection zone, and so forth. Signals reflected from the resistive body 116 are propagated upwardly toward the seismic receivers 103 for detection by the receivers (and collected as recorded wavefields). Measurement data is collected by the receivers 103, which can store the measurement data and/or transmit the measurement data back to a computer-implemented control system 106 on the sea vessel 100.

In accordance with some embodiments, the multiple sources 105 can be activated simultaneously (or substantially simultaneously). The term "substantially simultaneously" refers to activations of the sources that are within some predefined time lag (e.g., in the range of seconds) between activations, where the time lag is known. The simultaneous or substantially simultaneous activations of seismic sources would cause each of the seismic receivers 103 to provide a composite seismic response that results from activations of the multiple seismic sources.

Alternatively, instead of activating the seismic sources simultaneously or substantially simultaneously, a different embodiment involves the acquisition of response data due to successive discrete activations of the seismic sources, and summing the response data to form the composite response data. In other words, seismic data is recorded for discrete activation of the seismic sources, with the discrete recorded seismic data (discrete response data) for the different seismic sources summed together to form the composite response data.

Techniques according to some embodiments for performing migration can be applied to either type of composite seismic response data. In one embodiment, the migration performed is a finite-difference (f-d) migration. More generally, "migration" refers to the process of generating an image of a portion of a subterranean structure, in which the image is improved by correcting for lateral mis-positioning of dipping seismic reflectors, misplacement of subterranean reflectors due to structural dip, discontinuities, curvature of formation, and/or other factors.

Figure 2A:
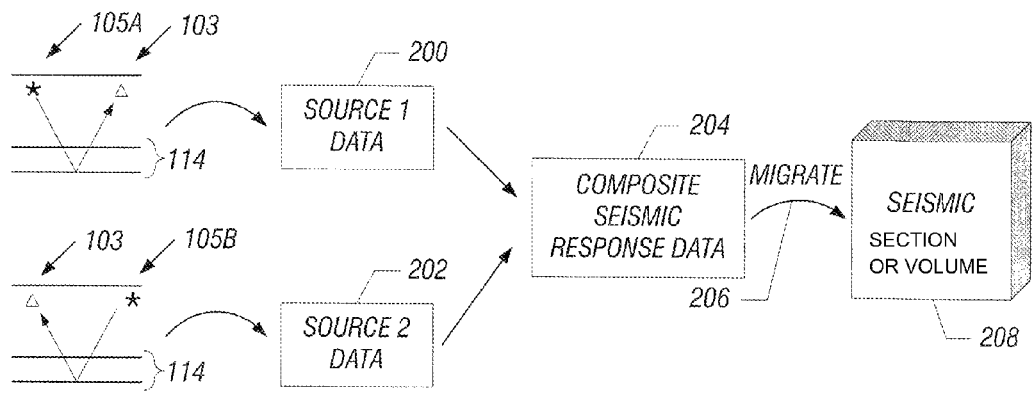
FIGS. 2A and 2B illustrate two different processes of performing migration in accordance with an embodiment.
Figure 2B:
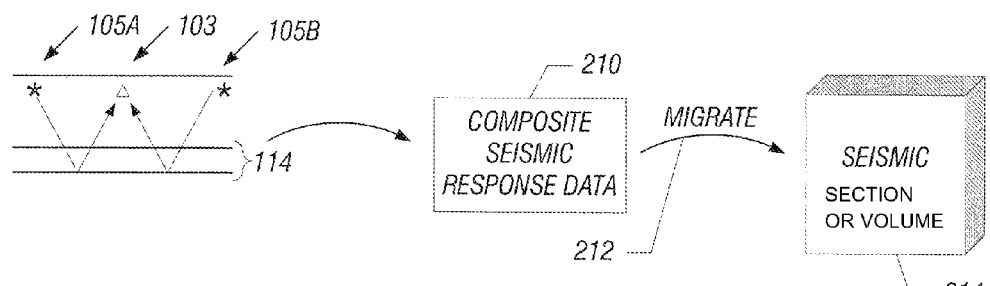

FIGS. 2A and 2B illustrate migration based on the two different types of composite seismic response data. In FIG. 2A, a first seismic source 105A is activated to cause propagation of seismic signals into the subterranean structure 114. The reflected seismic signals are detected by a seismic receiver 103. The signals received by the receiver 103 in response to the first seismic source 105A produces source 1 seismic response data 200.

At a later time, a second seismic source 105B is activated, which causes seismic signals to be propagated into the subterranean structure 114. Reflected seismic signals are detected by the seismic receiver 103, which detected signals produce source 2 seismic response data 202. The source 1 seismic response data 200 and source 2 seismic response data 202 are combined (e.g., by summing) to produce composite seismic response data 204. Migration (206) is then performed on the composite seismic response data 204 to produce an image of a seismic section or volume 208 that represents the subterranean structure 114. A seismic section is a two-dimensional (2D) representation, whereas a seismic volume is a three-dimensional (3D) representation of a portion of the subterranean structure 114.

FIG. 2B depicts a different type of composite seismic response data. In FIG. 2B, the two seismic sources 105A and 105B are activated simultaneously (or substantially simultaneously). As a result, the seismic receiver 103 receives reflected seismic signals in response to the seismic signals produced by the seismic sources 105A and 105B. The detected seismic signals at the seismic receiver 103, due to simultaneous or substantially simultaneous activations of the plural seismic sources 105A, 105B produce composite seismic response data 210. Migration (212) is performed based on the composite seismic response data 210 to produce an image of a seismic section or volume 214 that represents the subterranean structure 114.

In either the FIG. 2A or 2B implementation, each seismic source can be activated multiple times (shot multiple times). Thus, the composite response data collected by each receiver includes response data for multiple shots of each of the seismic sources.

Performing migration, such as finite-difference (f-d) migration, based on composite seismic response data is computationally less costly than performing multiple migrations based on separate response data for individual seismic sources. However, the reduction in computation cost in migration based on composite seismic response data is offset by some additional noise, which arises as a consequence of the imaging condition. In accordance with some embodiments, a technique is applied to remove this noise. In one embodiment, the technique is a phase encoding technique, which attenuates the noise.

In some embodiments, the phase encoding algorithm is based on the assumption that the Fourier components of the noise (or error) term are slowly varying functions of frequency. The imaging condition used in the migration algorithm according to an embodiment is as follows:

$$M(x, y, z) = \text{Re} \sum_{\omega}^{n\omega} U(x, y, z, \omega) \cdot \overline{D}(x, y, z, \omega), \quad \text{(Eq. 1)}$$

where M represents an image of the subterranean structure and is the reflectivity at location (x, y, z), and U and D are the extrapolated recorded and source seismic wavefields, respectively. The parameters x and y represent the two orthogonal lateral directions, and z represents the depth (vertical) direction. Note that U and D are initially time records—a Fourier transform can be applied to transform U and D to the frequency domain, as expressed in Eq. 1. In Eq. 1, ω represents frequency (note that a source wavefield has multiple frequencies). Also, $\overline{D}$ indicates that it is a complex conjugate. The "Re" operator of Eq. 1 takes the real part of the expression. Eq. 1 expresses a simple form of imaging condition. In other implementations, other imaging conditions can be used.

The linearity of the right-hand side of Eq. 1 makes Eq. 1 suitable for imaging composite shot records (records based on composite response data due to multiple seismic sources). As conventionally performed, migrating shots based on individual seismic sources and summing their images gives $$I = \sum_{\omega} \sum_{shot} U_{shot} \cdot \overline{D}_{shot}, \quad \text{(Eq. 2)}$$

where the frequency dependence of U and D, and the taking of the real part is implicitly assumed. In Eq. 2, $U_{shot}$ is the recorded seismic wavefield due to a source wavefield $\overline{D}_{shot}$ for a particular single seismic source (shot). In Eq. 2, $U_{shot}$ is combined (multiplied) with $\overline{D}_{shot}$ for each individual seismic source to produce a discrete image for the corresponding single seismic source. The products (representing respective discrete images) are summed (over the multiple seismic sources) to produce a composite image I. I is what is obtained from conventional shot migration (in which discrete migrations are performed for each individual seismic source to produce discrete images, which are then summed to together to form I) and will subsequently be referred to as the "correct result."

The corresponding expression for migration based on composite response data is $$I_{summed} = \sum_{\omega}\left(\sum_{shot}U_{shot}\right)\cdot\left(\sum_{shot}\overline{D}_{shot}\right), \quad \text{(Eq. 3)}$$

where $$\sum_{shot}U_{shot}$$

represents a composite recorded seismic wavefield made up of the sum of individual recorded wavefields $U_{shot}$ due to respective individual seismic sources, and $$\sum_{shot}\overline{D}_{shot}$$

represents the composite seismic source wavefield. $I_{summed}$ is equal to the sum of the correct result (Eq. 2) and a noise term including crossterms, $$I_{summed} = I + crossterms, \quad \text{(Eq. 4)}$$

where $$crossterms = \sum_{\omega}\sum_{i,j(j\neq i)}U_i\overline{D}_j. \quad \text{(Eq. 5)}$$

The phase encoding algorithm according to an embodiment seeks to minimize contributions from the crossterms (noise terms). The encoding of each Fourier component of the recorded wavefield and the initial shot wavefield may be written symbolically as $$U_{shot}(x,y,z=0,\omega) \rightarrow U_{shot}(x,y,z=0,\omega)\cdot\exp(i\phi(\omega,shot,mig)), \quad \text{(Eq. 6)}$$

where $U_{shot}(x, y, z=0, \omega)$ is the initial recorded wavefield at the surface (z=0), and $\exp(i\phi(\omega, shot, mig))$ is a phase factor to be applied to the initial recorded wavefield at the surface. Applying the phase factor as in Eq. 6 is part of the phase encoding.

The phase (or phase shift) $\phi(\ )$ may be a function of frequency ($\omega$), shot record (shot) and possibly migration (mig, if more than one migration is performed). The phase encoding takes place prior to extrapolation and at z=0. However, the linearity of the migration operator ensures that the above forms hold for all z. If the phase is a function of only the shot record, the procedure will be referred to as shot encoding. If the phase is a function of only the frequency, then it will be referred to as frequency encoding. In general, $$I_{summed} = I + \sum_{\omega}^{n\omega}\sum_{k,l(k\neq l)}^{nshots}U_{k,\omega}\cdot\overline{D}_{l,\omega}\cdot\exp(i(\phi_{k,\omega,mig}-\phi_{l,\omega,mig})), \quad \text{(Eq. 7)}$$

where the objective is to minimize the contributions from the crossterms (the summing term that is summed with I in Eq. 7).

One way to do this is to use phases chosen at random and possibly repeat the migration using different encodings. The image from using N composite shot migrations, where each composite shot migration includes nshots shot gathers is $$I_{summed} = \quad \text{(Eq. 8)}$$

$$N\cdot I + \sum_{\omega}^{n\omega}\sum_{k,l(k\neq l)}^{nshots}U_{k,\omega}\cdot\overline{D}_{l,\omega}\cdot\sum_{mig}^{N}\exp(i(\phi_{k,\omega,mig}-\phi_{l,\omega,mig})).$$

Therefore, the correct image will be amplified and the crossterms will be attenuated as N (the number of migrations) increases. So far no assumption has been made regarding the shot locations, and all shots from a given line could be used to form a composite shot. Alternatively, consider using only neighboring shots to form each composite shot. It can be assumed that the extrapolated wavefields from each constituent shot are approximately equal (referred to the "closely spaced shot" spacing assumption). Therefore, setting $U\cdot\overline{D}=U_i\cdot\overline{D}_j$ for all i,j (which assumes that different shots are close together and do not vary much) permits a more immediate derivation of the equation for eliminating the crossterms. This equation is $$crossterms = \text{Re}\left\{U\cdot\overline{D}\sum_{i,j(i<j)}^{nshots}\cos(\phi_i-\phi_j)\right\}, \quad \text{(Eq. 9)}$$

where "Re" indicates that the real part is considered, and the right-hand side of Eq. 9 is zero if $$\sum_{i,j(i<j)}^{nshots}\cos(\phi_i-\phi_j)=0.$$

Reordering the above gives:

$$0=\cos(\phi_1-\phi_2)+\cos(\phi_1-\phi_3)+\cos(\phi_1-\phi_4)+\ldots$$

$$+\cos(\phi_2-\phi_3)+\cos(\phi_2-\phi_4)+\ldots$$

$$+\cos(\phi_3-\phi_4)+ \quad \text{(Eq. 10)}$$

To solve for the required phases, a value of $\phi_1$ is assumed. Then proceeding from left to right: each column of the above is required to be zero, and the unknown $\phi$ in that column is determined. Given the initial assumption of $\phi_1$, a value for $\phi_2$ can be selected to make the first column of Eq. 10 equal 0. Then, next, since $\phi_1$ and $\phi_2$ are known, then a $\phi_3$ can be selected to make the sum of the terms in the second column equal to zero, by solving for a trigonometric equation. This procedure is repeated for the other columns. However, the "closely spaced shot" spacing assumption noted is not valid in many real-world applications, such as when there are fifty-meter or greater spacing between seismic sources. To address the shortcomings of the closely spaced shot assumption, it is assumed that the crossterms are slowly varying functions of frequency. Using this assumption, phase shifts are chosen for a number of consecutive frequencies (nf) such that $$\sum_{\omega}^{nf} \exp(i(\phi_{k,\omega} - \phi_{l,\omega})) = 0 \qquad \text{(Eq. 11)}$$

for each pair of constituent shot records denoted by l,k.

The phase encoding based on selection of phase shifts for Eqs. 9 and 10, which is based on the closely spaced shot spacing assumption, is referred to as shot encoding. On the other hand, the phase encoding based on selection of phase shifts according to Eq. 11, which assumes that crossterms are slowly varying functions of frequency ω, is referred to as frequency encoding.

The number of consecutive frequencies (nf) is chosen to be relatively small. Thus, given that the recorded seismic wavefield can have L frequencies, where L>nf, then Eq. 11 can be applied to groups of nf frequencies to solve for the phase shifts φ for these different groups. The phase shifts are determined by solving for a system of equations for corresponding groups of frequencies, according to Eq. 11. The phase shifts are then used to compute phase factors for application to the composite response data according to Eq. 7.

Figure 3:
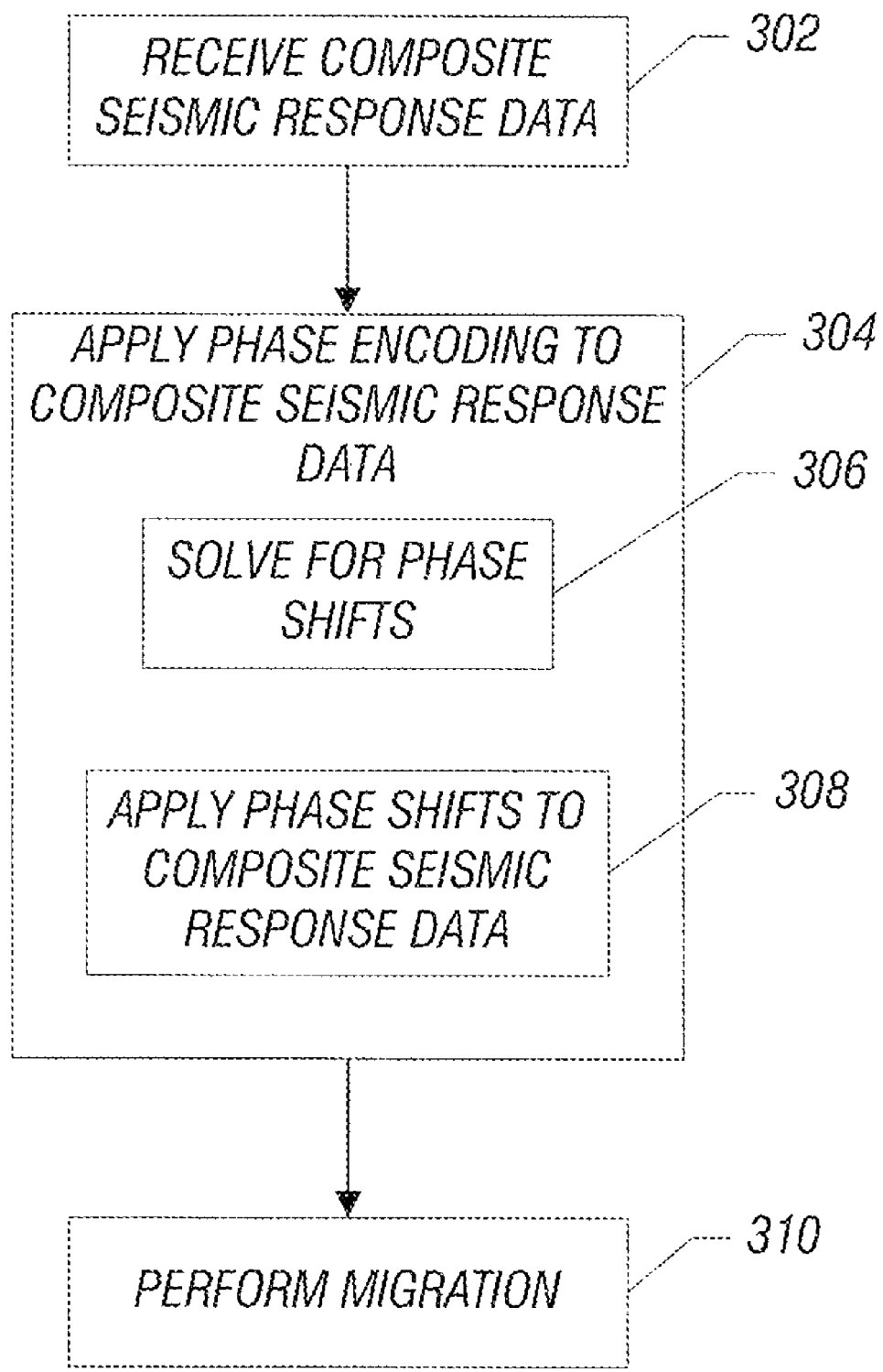
FIG. 3 is a flow diagram of a procedure of performing migration according to an embodiment.

FIG. 3 is a flow diagram of a process of performing migration according to an embodiment. The process can be performed by software executable on a computer (see FIG. 4), for example. The process receives (at 302) composite seismic response data, where the composite seismic response data can be computed using either the technique according to FIG. 2A or the technique according to FIG. 2B. The composite seismic response data includes the composite recorded seismic wavefield due to a predetermined number of seismic sources. Note that a migration can be based on a relatively large number of seismic sources (e.g., 100). Instead of using a composite seismic response data that is based on all 100 of these seismic sources, the total number of seismic sources can be divided into smaller subsets, with composite seismic response data for these subsets of seismic sources considered, according to some embodiments. The benefit of considering composite seismic response data for a smaller number of seismic sources is that the system of equations according to Eq. 11 is smaller and is more easily solved. However, if a particular computer has sufficient processing capabilities, then the composite seismic response data that is received at 302 can be the composite seismic response data for all seismic sources, rather than just subsets of the seismic sources.

Next, phase encoding according to some embodiments is applied (at 304) to the received composite seismic response data. The phase encoding applied to the composite seismic response data is frequency encoding, in which the crossterms of the composite seismic response data are assumed to be slowly varying functions of frequency. In applying the phase encoding, the phase shifts for different shots and at different frequencies are solved for (at 306), according to Eq. 11. As noted above, solving for phase shifts can be performed on groups of nf consecutive frequencies at a time. The selected phase shifts are then used to derive phase factors that are applied to the composite seismic response data (at 308) according to Eq. 7. The effect of applying the phase factors to the composite seismic response data is that the crossterm contribution to the composite seismic response data is reduced or eliminated to achieve more accurate migration.

Next, once phase encoding has been applied to the composite seismic response data (which is $$\sum_{shot} U_{shot} \Big),$$

then migration can be performed (at 310) according to Eq. 3 using the phase-encoded composite seismic response data.

To achieve better quality data, multiple migrations can be performed in which frequency encoding as discussed above is applied. For the different migrations, different phase shift values are calculated by randomly varying initial assumptions of phase shift values. Then, an average of the solution for the multiple migrations can be used as the result to achieve better quality.

Figure 4:
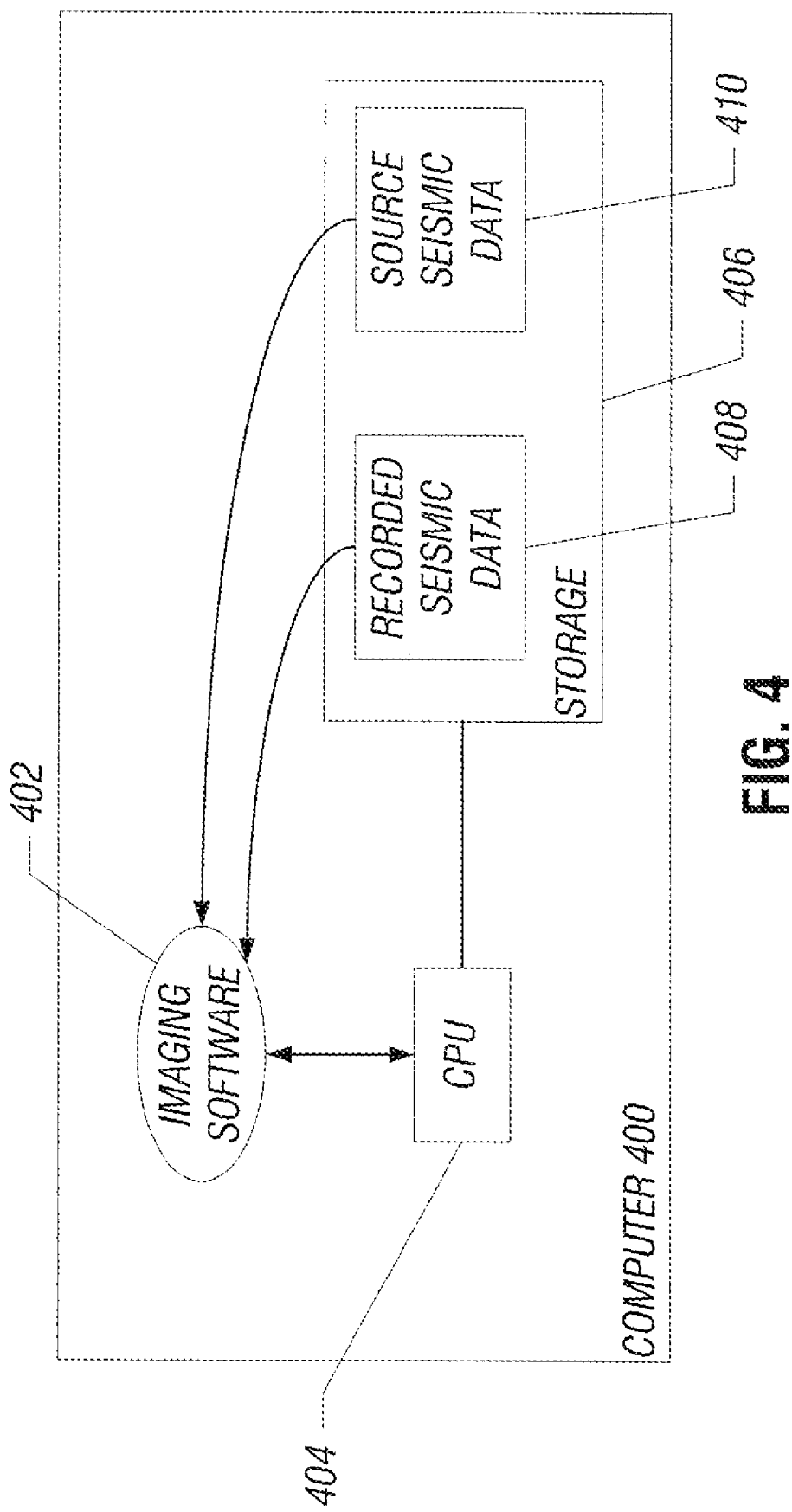
FIG. 4 is a block diagram of an example computer in which software is executable to perform the procedure of FIG. 3, according to an embodiment.

FIG. 4 shows a computer 400 that includes an imaging software 402 executable on one or more central processing units 404. The one or more CPU(s) 404 are connected to a storage 406 that stores recorded seismic data 408 and source seismic data 410, which are retrieved by the imaging software 402 for performing migration according to some embodiments.

Instructions of software described above (including imaging software 402 of FIG. 4) are loaded for execution on a processor (such as one or more CPUs 404 in FIG. 4). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of characterizing a subterranean structure comprising:
    receiving, by a computer, composite seismic response data resulting from a plurality of seismic sources;
    applying, by the computer, phase encoding to the composite seismic response data in which phase shifts are selected based on considering frequency variation of noise terms in the composite seismic response data;
    migrating, by the computer, the phase-encoded composite seismic response data; and
    producing, by the computer, a representation of the subterranean structure according to the migrating.

2. The method of claim 1, wherein receiving the composite seismic response data comprises receiving the composite seismic response data that results from substantially simultaneous activation of the plurality of seismic sources.

3. The method of claim 1, wherein receiving the composite seismic response data comprises receiving the composite seismic response data that is combined from individual seismic response data for individual ones of the seismic sources.

4. The method of claim 1, wherein producing the representation of the subterranean structure comprises producing an image of one of a two-dimensional section and a three-dimensional volume of the subterranean structure.

5. The method of claim 1, wherein migrating the phase-encoded composite seismic response data comprises performing finite-difference migration.

6. The method of claim 1, wherein applying the phase encoding to the composite seismic response data comprises applying the phase encoding that assumes the noise terms vary with frequency.

7. The method of claim 1, wherein applying the phase encoding comprises:

computing phase shifts to determine phase factors to apply to the composite seismic response data to reduce the noise terms.

8. The method of claim 7, wherein applying the phase encoding further comprises:

selecting groups of frequencies;

wherein computing the phase shifts comprises solving for the phase shifts for different groups of the frequencies.

9. The method of claim 1, further comprising performing plural migrations, wherein performing the plural migrations comprises:

for each migration, applying different phase encoding to the composite seismic response data; and for each migration, migrating the corresponding phase-encoded composite seismic response data.

10. The method of claim 9, further comprising averaging results of the plural migrations to provide the representation of the subterranean structure.

11. The method of claim 1, wherein applying the phase encoding to the composite seismic response data reduces the noise terms in the composite seismic response data.

12. The method of claim 11, wherein the noise terms comprise crossterms of source and recorded seismic wavefields.

13. The method of claim 1, wherein receiving the composite seismic response data comprises receiving the composite seismic response data based on data received by a seismic receiver towed in a body of water.

14. The method of claim 1, wherein receiving the composite seismic response data comprises receiving the composite seismic response data based on data received by a seismic receiver in response to the seismic sources that each is activated multiple times to provide multiple shots.

15. An article comprising at least one computer-readable storage medium containing instructions that when executed cause a computer to:

receive composite seismic response data resulting from activations of a plurality of seismic sources;

determine phase factors to combine with the composite seismic response data, wherein the phase factors are determined based on computing phase shifts that vary with frequency;

apply phase encoding to the composite seismic response according to the determined phase factors;

migrate the phase-encoded composite seismic response data; and produce a representation of the subterranean structure according to the migrating.

16. The article of claim 15, wherein receiving the composite seismic response data comprises receiving the composite seismic response data that results from substantially simultaneous activations of the plurality of seismic sources.

17. The article of claim 15, wherein receiving the composite seismic response data comprises receiving the composite seismic response data that is combined from individual seismic response data for individual ones of the seismic sources.

18. The article of claim 15, wherein producing the representation of the subterranean structure comprises producing an image of one of a two-dimensional section and a three-dimensional volume of the subterranean structure.

19. A computer comprising:

a processor; and software executable on the processor to:

receive composite seismic response data resulting from a plurality of seismic sources;

apply phase encoding to the composite seismic response data in which phase shifts are selected based on considering frequency variation of noise terms in the composite seismic response data;

migrate the phase-encoded composite seismic response data; and produce a representation of the subterranean structure according to the migrating.

20. The computer of claim 19, wherein the composite seismic response data results from substantially simultaneous activations of the plurality of seismic sources.

21. The computer of claim 19 wherein the composite seismic response data is combined from individual seismic response data for individual ones of the seismic sources.

* * * * *